United States Patent
Havansi

[19]

[11] Patent Number: 5,905,714
[45] Date of Patent: May 18, 1999

[54] METHOD FOR REROUTING A PACKET-MODE DATA CONNECTION

[75] Inventor: Klaus Havansi, Espoo, Finland

[73] Assignee: Nokia Telecommunications Oy, Espoo, Finland

[21] Appl. No.: 08/700,522

[22] PCT Filed: Feb. 28, 1995

[86] PCT No.: PCT/FI95/00112

§ 371 Date: Aug. 26, 1996

§ 102(e) Date: Aug. 26, 1996

[87] PCT Pub. No.: WO95/24085

PCT Pub. Date: Sep. 8, 1995

[30] Foreign Application Priority Data

Feb. 28, 1994 [FI] Finland ..................................... 940939

[51] Int. Cl.[6] .......................... G01R 31/08; G06F 11/00; G08C 15/00
[52] U.S. Cl. ........................... 370/242; 370/218; 370/237
[58] Field of Search .................................... 370/242, 245, 370/250, 229, 235, 237, 218, 219, 236, 238, 244

[56] References Cited

U.S. PATENT DOCUMENTS

| | | | |
|---|---|---|---|
| 4,799,215 | 1/1989 | Suzuki | 370/218 |
| 4,825,206 | 4/1989 | Brice, Jr. et al. | 370/216 |
| 4,884,263 | 11/1989 | Suzuki | 370/218 |
| 5,241,534 | 8/1993 | Omuro | 370/237 |
| 5,258,897 | 11/1993 | Komine et al. | |
| 5,268,897 | 12/1993 | Komine et al. | 370/400 |
| 5,412,376 | 5/1995 | Chujo | 370/397 |
| 5,610,918 | 3/1997 | Kamo et al. | 370/395 |
| 5,638,359 | 6/1997 | Peltola et al. | 370/229 |

FOREIGN PATENT DOCUMENTS

484 943   5/1992   European Pat. Off. .

Primary Examiner—Chi H. Pham
Assistant Examiner—Steven Nguyen
Attorney, Agent, or Firm—Pillsbury Madison & Sutro LLP

[57] ABSTRACT

A method for rerouting a packet-mode data connection, especially a frame relay network data connection, in which, traffic transmitted between two nodes is transferred from a first route to be disabled to a second, new route. In a rerouting situation, data packets to be transmitted to a new route are buffered, when needed, in a transmitter in order to perform checking concerning the route or to ensure the correct order of the data packets. In order to accomplish rerouting as fast as possible and with a minimum loss of data, the opposite end is notified of the need for buffering by sending a message, the contents of which depend on the rerouting situation in question.

19 Claims, 3 Drawing Sheets

METHOD FOR REROUTING A PACKET-MODE DATA CONNECTION

This application claims benefit of international application PCT/FI95/00112, filed Feb. 28, 1995.

BACKGROUND OF THE INVENTION

The invention relates to a method for rerouting a packet-mode data connection.

In principle, the method of the invention can be applied in any packet switched network but the invention is primarily intended for a FR network (Frame Relay network) for which its features (the use of buffering) are very well suited. However, the invention can also be used in a (generally faster) ATM (Asynchronous Transfer Mode) network, for example.

Replacing previous packet network connections, Frame Relay is a packet network technique for transmitting frames of varying lengths, a heavily stripped-down version of a nowadays generally used protocol (X.25) that requires a lot of processing. By stripping operations that have become in a way unnecessary with time because of improvements in the quality of the transmission network, frame relay in the Frame Relay technique has become faster and more efficient.

ATM is a new packet-switching technique in which the problems of conventional packet networks have been solved by introducing short packets of a standard length (53 bytes) known as cells. Each cell contains a payload part of 48 bytes and a header of 5 bytes in length.

However, in this connection the FR or ATM technology will not be described any further as the method of the invention is not connected to any FR or ATM specific arrangements, but the node devices of the network are only required to have an ability to buffer. Frame Relay service is generally described in the CCIT recommendation I.233, "Frame Mode Bearer Services", a the related protocol recommendation Q.922. For a more detailed description of the Frame Relay technique, a reference is made to the article "An Overview of Frame Relay Technology", Data-pro Management of Data Communications, McGraw-Hill Incorporated, April 1991. A closer description of the ATM technology can be found, for example, in the CCITT recommendation I.610, "B-ISDN operation and maintenance principles and functions", CCITT Study Group XVIII Geneva, Jun. 9–19, 1992, or in the recommendation I.361, "B-ISDN ATM Layer Specification", CCITT; ANSI T1.617 Annex D.

In packet networks, connections can be "protected" by having one or two alternative routes between nodes in addition to the main route. In this case, traffic can be transferred from one route to another if necessary. One of the requirements of the ATM network is, for example, that the order of the cells in the connection will remain invariable in the network. Because the ATM headers of the data cells do not have a sequence number to make the rearrangement of the cells possible, the connection has to travel via the same route through the network.

Transferring traffic from one route to another leads very probably to changes in the order of the cells and thus, loss of data, in case the delay of the new route is smaller than that of the old route.

SUMMARY OF THE INVENTION

It is an object of the present invention to eliminate the above-mentioned disadvantage and to achieve a method in which a virtual connection transmitting packet-mode data is transferred from one route to another as fast as possible with a minimum loss of traffic, even in conflict situations in which the nodes at the termination points of the route have contradictory information about the routes in use.

The idea of the invention is to accomplish a dialogue which is based on mutual message exchange between the nodes, and on the basis of which the nodes will buffer data in their transmitters only when needed and also, until they can ascertain that they are transferring data to the same route so that the order of the packets at the opposite end will not be changed. The opposite end is notified of the need for buffering in each rerouting situation by a message exchange.

The method of the invention provides maximum probability that the packet data will reach its destination and do so in the correct order. Traffic is lost only when an active route becomes physically faulty, and eventhen, only the traffic already transmitted in between the appearance and detection of the fault is lost.

BRIEF DESCRIPTION OF THE DRAWINGS

In the following, the invention and its preferred embodiment are described in more detail with reference to the example of the accompanying drawing, in which.

DETAILED DESCRIPTION

The method of the invention is especially suitable for networks using semi-permanent virtual connections (PVC) in case:

a) traffic on a faulty active route has to be transferred to an alternative route, or b) traffic on an active route which is in order is directed to another route.

In the following, alternative a) is called forced rerouting and alternative b), controlled rerouting. Controlled rerouting is performed either when disabling a route for maintenance procedures or when returning from an alternative route to an ordinary route.

The ends of a virtual connection are often in different nodes far away from each other. Thus, the different nodes control the ends of the virtual connection independently.

Figure 1:
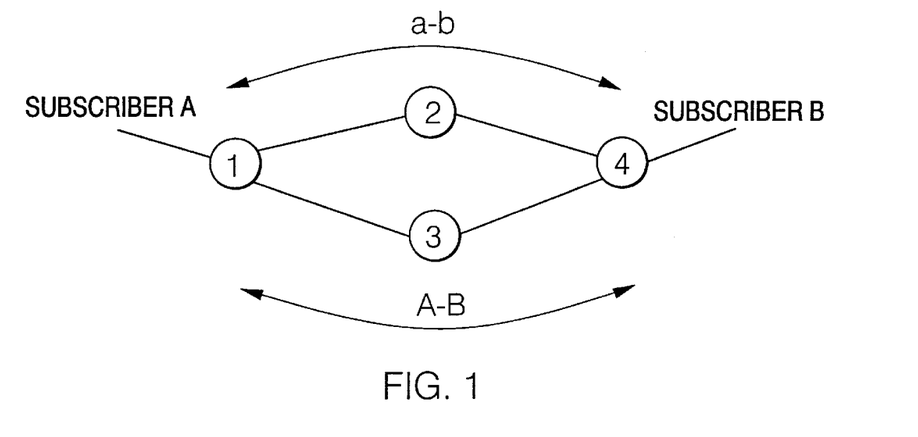
FIG. 1 shows a part of a packet-switched network that has two possible routes between two nodes.

FIG. 1 shows a network or a part of a network in which there are two possible routes between subscribers A and B. Nodes of the network are denoted by reference numerals 1 . . . 4 and alternative routes between the nodes 1 and 4 are denoted by reference signs a–b and A–B. The following markings are used in the description:

subscriber A—the first party of the data connection subscriber B—the second party of the data connection a–b, A–B—bidirectional routes on which the data of subscriber A or B can be transmitted a→b, A→B—unidirectional routes on which the data of subscriber A can be transmitted to subscriber B b→a, B→A—unidirectional routes on which the data of subscriber B can be transmitted to subscriber A.

Figure 2:
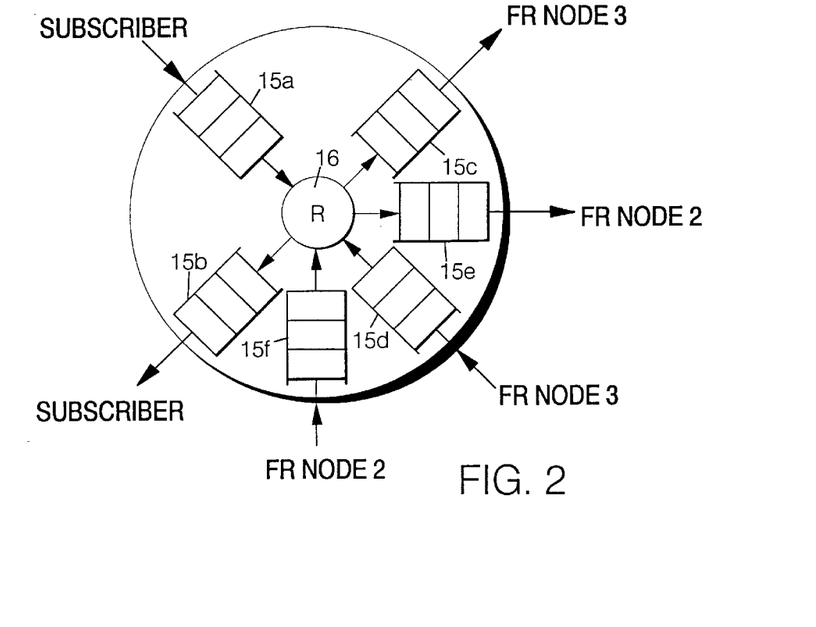
FIG. 2 shows a schematic structure of the nodes in the termination points of the routes according to FIG. 1.

The method of the invention does not, as such, require of the internal structure of the node anything else but the ability to buffer data. Thus, the internal structure of the node can vary in many ways depending on the network in use. The node (1 or 4) can simply be similar to a FR node (known per se), as shown in FIG. 2, in which a FR frame from a subscriber is received in an input buffer 15a, from which it is switched further onto a router 16, which routes it onto a correct output buffer (15c or 15e). In this case (cf. FIG. 1), there are two trunk connections (to nodes 2 and 3) and one subscriber connection (buffers 15a and 15b).

A description is first given of forced rerouting that is a result of faults in the connection.

In the example, it is presumed that in an initial situation the route a–b is active. Forced rerouting starts when, for example, node 1 detects that the route a→b transmitting traffic is faulty (the node detects that the data link to the opposite end is not operating). The detection can be based, for example, on a notification of the fault from the opposite end. After a fault detection of this kind, node 1 immediately transfers the traffic (the data packets to be transmitted) to a usable alternative route A→B and sends a notice of this to the opposite end (node 4) via this new route. According to a more advantageous (more efficient) embodiment, the order is as shown above; the node first transfers the traffic to be transmitted on an alternative route and only after that, sends said notice. (Rerouting is performed first so that no frame is lost unnecessarily.)

If node 4 detects the fault at the same time as node 1, both nodes transfer the traffic to the route A–B simultaneously. Both nodes also receive a notice from the opposite end of the transition of the other traffic direction to the same bidirectional route that it has just started or is just starting to use. In this case, the nodes are satisfied with these notices and forced rerouting is complete.

If node 4 does not detect the fault fast enough, it receives, as a first indication of the fault on the route a–b, a notice, from an alternative route A–B of its own, of the transition of the opposite end to operate on this new route. (In the method of the invention the nodes are also constantly listening to the routes that are in reserve.) At the latest, after receiving this notice, node 4 accepts all the incoming traffic from the route A–B and transmits it forwards to the subscriber. At the same time, node 4 starts buffering the data packets to be transmitted to an active route b→a and also tests the condition of the route b→a. The testing can be conducted, for example, with a "ping-pong" type of message exchange which has the advantage that it will thus allow the condition of the whole connection to be tested. After finding the route b→a to b faulty, node 4 sends the buffered frames via a new route B→A and continues to direct traffic to the route B→A. In this case forced rerouting is complete.

In a possible conflict situation, in which the different ends (nodes 1 and 4) of a virtual connection want to transfer the traffic to different routes, the conception of one node is always dominating. The messages used for managing the virtual connection have a field in which the rank of different ends is shown (the position of the field in a frame depends on the protocol in use). This identifier can, for example, be a node number in the network, in which case the node with a higher number, for example, dominates the node with a lower number.

A conflict situation is created if the virtual connection between subscribers A and B also has a third route a'–b' (not shown in the figure) that is configured in node 1, for example, to be a secondary alternative route, but is configured in node 4, to be a primary alternative route. In this case, the operation of node 4 depends on whether it is a dominating or an obeying node.

In case node 4 is dominating, it sends the buffered packets via its own primary alternative route a'–b' and commands the opposite end to use this route, too. Thereafter, the obeying node 1 transfers the traffic to the route a'–b' by means of controlled rerouting, by which the nodes make sure, by using a special return-from-route notice and an acknowledgement in response to it, that all the data messages have arrived at the opposite end before transferring the transmission to a new route. Controlled rerouting and the message exchange used therein are described in more detail below.

If node 4 detects during forced rerouting described above, that the fault has disappeared in the original route b→a, a conflict situation is created, in which the operation of the node 4 again depends on whether it is a dominating or an obeying node. If a dominating node detects that the original route is in order again, it stops the buffering of the data packets to be transmitted to the virtual connection, transmits the buffered packets via the original route, and commands the opposite end to use the original route by sending it a management message to this effect. In this case, it is most advantageous to keep the order of things such that the management message is sent first and the data packets only after that. If an obeying node detects that the original route is in order again, it will not transfer the traffic directly back to the original route but acts as in controlled rerouting, (discussed herein below) ensuring first by means of a message exchange that all the data packets have arrived from the route to be disabled to the opposite end before new data packets are transmitted on the new route.

In one (fast) embodiment of the invention, the above-described forced rerouting is made even more effective in such a way that the node detecting the fault first commands the opposite end, by sending a special forced rerouting message, to transfer the traffic to a new route immediately, that is, wholly without buffering. The node that has received this command will test the condition of the old active route only after transferring the traffic from old active route.

When both ends of the virtual connection detect at the same time that the active route is faulty, they send forced rerouting commands via the new active routes they have selected. The nodes select different routes, for example, when their routing information is divergent, as described above in connection with the route a'–b'. In this case, after receiving a forced rerouting command, the obeying node is forced to transfer traffic from the route it selected, to the route the dominating node selected, without any safety measures (buffering). The danger of changes to the order of the data packets is then quite evident.

The above-described fast forced rerouting is therefore subject to faults if the routing data at the different ends of the virtual connection are contradictory. If the routing data of the virtual connection is in order, this method is, however, quite safe. An advantage of this embodiment is its speed, since the data packets are not buffered.

Forced rerouting and its different embodiments are described above. In the following, an alternative method is described, that is, controlled rerouting which does not involve a fault situation as forced rerouting does, but a situation in which there is no real necessity to perform rerouting as fast as possible, because both routes of the connection are still in use.

Controlled rerouting from the route A–B to the route a–b is started, for example, when the primary route a–b is in order again or when the network operator wants to disable the route A–B for some other reason. In a typical situation, the primary route is the fastest one of the alternative routes and, thus, it is always used when it is in order, if possible. Therefore, even the example of controlled rerouting described here concerns a return to the primary route a–b.

If node 1, for instance, is the first one to start controlled rerouting, it starts buffering the data packets to be transmitted to the virtual connection and notifies the opposite end (for example, via the route to be enabled) that it is enabling the route a→b. Thus, it is advantageous to the invention that all these management messages concern just the route on which they travel. In this case, the different ends need not have any common route identification data.

When node 4 is satisfied with this new route, node 4 starts buffering the traffic, too, and transmits a corresponding notice to node 1. In conflict situations, in which the different ends of the virtual connection intend to transfer traffic to different routes, the conception of one node is dominating, in the manner described above. When the nodes have agreed upon the new active route, they both send to each other special return-from-route notices.

The return-from-route notice is sent to that route (A–B) of the virtual connection which is to be disabled, routed like ordinary data packets so that it will not overtake them. The return-from-route notice is transmitted to the route to be disabled after the data packets. When a node receives a return-from-route notice from the route of the virtual connection, it sends an acknowledgement via the same route to the sender. Upon receiving this acknowledgement about returning from the route, the node can be sure of the arrival of all the data packets from the route of the virtual connection to the opposite end unless they have been destroyed on the way.

When node 1 has received a return-from-route acknowledgement from the route A–B to be disabled, it stops buffering the data packets to be transmitted to the virtual connection and transmits the buffered data packets to a new active route a→b. When node 4 has also received a return-from-route acknowledgement and acted correspondingly, the traffic as a whole is transferred to the route a–b that messages are not lost or their order is not changed because of rerouting.

According to one preferred embodiment of the invention, it is advisable to use time supervision in controlled rerouting as a further check in case a return-from-route acknowledgement does not arrive. After expiration of the time-out period, the buffering of traffic is stopped, which means that the time-out period must be of a long duration so that the probability of the wrong order of the data packets will be very small. On the other hand, the time supervision period be so short that it is very improbable that the ability of the node to buffer (depending on the length of the buffers in use) will end during the period.

The method of the invention makes sure that traffic is not received simultaneously from different routes of the virtual connection. The method can possibly be complemented so that the data packets are not accepted (even if received) from other routes after the nodes have come to an agreement on the route to be used. Thus, it is further ensured that the data packets do not arrive in a wrong order, but this will lead to a traffic blackout, for example, when a notice of rerouting gets lost because of a transmission error. Therefore, a better alternative is to transmit all the received data packets on to the subscriber.

Figure 3:
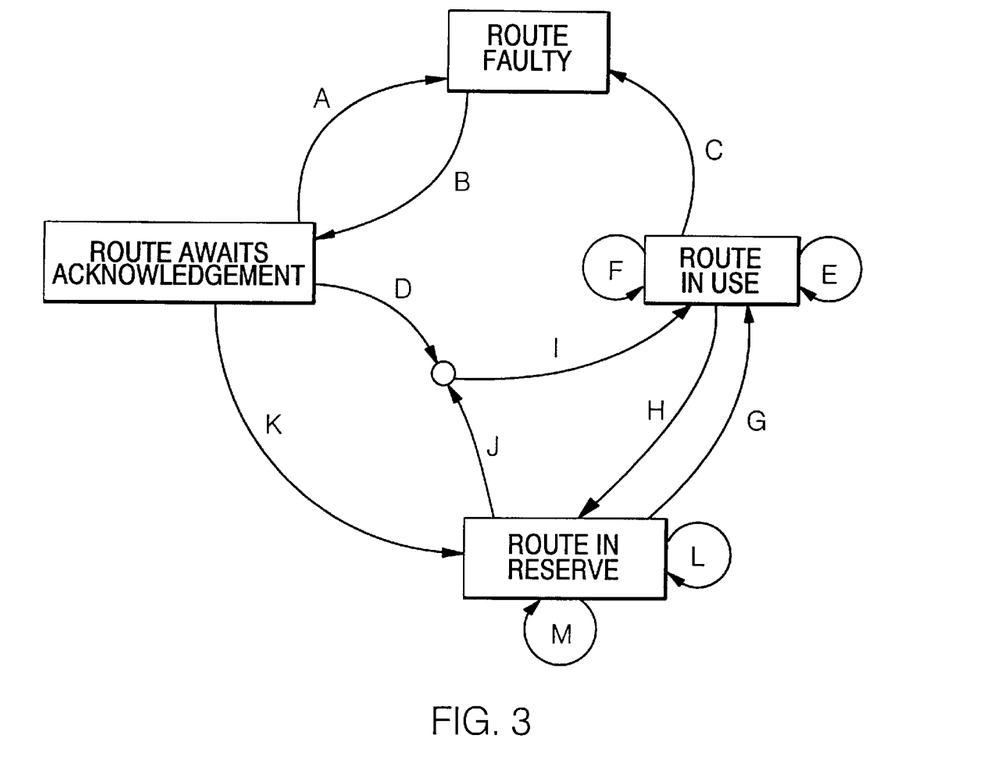
FIG. 3 shows the operation of a state machine for rerouting.
Figure 4:
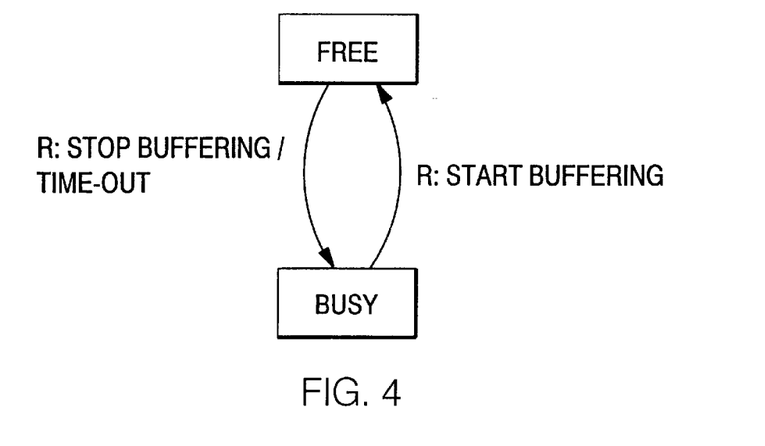
FIG. 4 shows the operation of a state machine for buffering.
Figure 5:
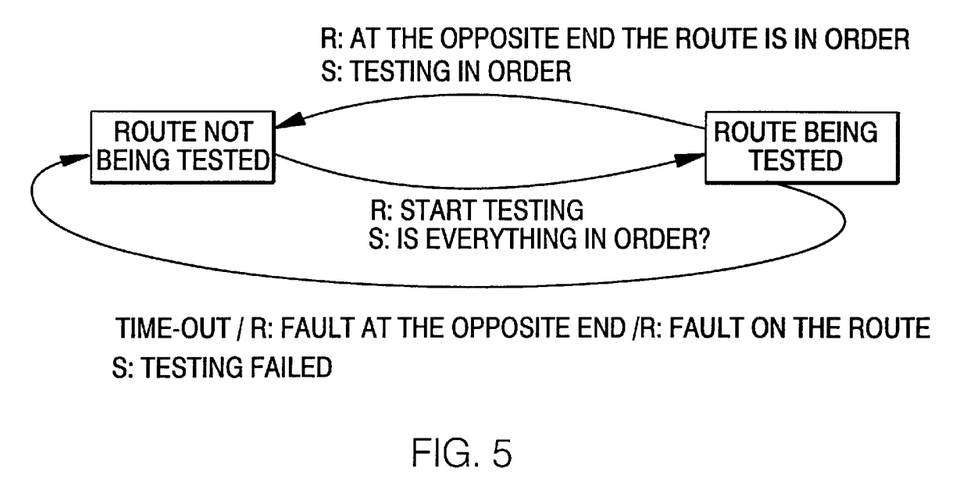
FIG. 5 shows the operation of a state machine for route testing.

FIGS. 3–5 show, as an example, the essential parts of state machines with which both forced rerouting and controlled rerouting can be performed (fast forced rerouting not being shown).

FIG. 3 shows the operation of a state machine concerning a route in a node. One route has four main states which are marked as follows: ROUTE IN USE, ROUTE IN RESERVE, ROUTE AWAITS ACKNOWLEDGEMENT, and ROUTE FAULTY. Transitions between these states are marked with reference signs A–M. Transitions to the state ROUTE IN USE from the states ROUTE AWAITS ACKNOWLEDGEMENT or ROUTE IN RESERVE can have two stages, D+I or J+I. Transitions caused by messages received by the node and the possible messages sent as a result of these transitions are described below. The received messages are shown by the letter R and a colon in front of them (R:). The messages to be sent are shown similarly by the letter S (S:). The messages can be any messages with the respective meanings described below, and do not necessarily have to come from the opposite node. Message can come from farther away or from the network management, for instance. In connection with the messages to be sent, the destination of a respective message is indicated after the letter S, separated by a slash. If the letter S is in parenthesis, it means that the respective message is not sent every time, but only when needed.

Transition A
   R: "Testing failed",
Transition B
   R: "Even the last fault has been removed from the route",
   S/opposite end: "Route in order here, how about there?"
Transition C
   R: "Testing failed",
   R: "Route faulty at my own end",
   R: "Fault on the route",
   R: "Fault at the opposite end",
   (S)/alternative route: "Get active at once".
All four received messages are alternative, and even one of them causes a transition from the state ROUTE IN USE to the state ROUTE FAULTY. In case of the first two messages, a message "Our end faulty" is sent when necessary. At Transition C, traffic is stopped (a fault situation).
Transition D
   R: "Route in order also at the obeying end".
Transition E (internal transition in the state ROUTE IN USE)
   R: "Possible forced rerouting",
   S: "Start testing".
Transition F (internal transition in the state ROUTE IN USE)
   R: "Testing in order",
   S: "Stop buffering".
Transition G
   R: "Get active at once",
   S/opposite end: "Traffic onto this route",
   S: "Stop buffering".
When this transition occurs, the node starts the traffic and sends the respective message.
Transition H
   R: "Return-from-route",
   S/opposite end: "Return-from-route".
Transition I
   S/opposite end: "Traffic onto this route",
   S: "Start buffering",
   S/former route: "Return-from-route".
Transition J
   R: "The opposite end priorities also allow enabling the route", R: "The dominating end uses this route".

Transition K
R: "Route also in order at the dominating end",
(S)/opposite end: "Our priorities allow enabling the route".

Transition L (internal transition in the state ROUTE IN RESERVE)
R: "Return-from-route acknowledgement",
S: "Stop buffering".

Instead of a return-from-route acknowledgement, the transition can be caused by the expiration of the time-out period.

Transition M (internal transition in the state ROUTE IN RESERVE)
R: "The obeying end uses this route",
S/active route: "Possible forced rerouting",
S: "Start buffering".

Forced rerouting and controlled rerouting comprise of the transitions described above. For example, the above-described controlled rerouting started by one node can include, for instance, transitions H and L (the route to be disabled) and B, K, J and I (the route to be enabled/obeying node) or B, D and I (the route to be enabled/dominating node). The priorities in the messages refer to the priority that is configured to the respective route in the node.

When the nodes detect a fault and start a forced rerouting at the same time, nodes make the transitions C (the route to be disabled) and G (the route to be enabled) only. If the dominating node does not detect the fault before the obeying node notifies of the rerouting, the dominating noder resorts (on the route to be disabled) the transitions M, E and C. In a conflict situation, in which the dominating node detects after the transitions M and E that the route is in order, it carries out only an internal transition F and the transitions C and G will not be made.

FIG. 4 shows a buffering automation (a state machine for buffering) that has two main states: FREE and BUSY. When a node receives a message saying "start buffering", the automation is transferred from the state FREE to the state BUSY, and the traffic of the data connection will be written in the buffer. When a message received in the state BUSY says "stop buffering," or after the expiration of the time-out period, as described above, the buffered traffic is transmitted to the data connection via the route in use. After this, the traffic will not be written in the buffer, and a transition is made to the state FREE.

FIG. 5 shows a testing automation of the route (a state machine for route testing) that also has two main states: ROUTE NOT TESTED and ROUTE BEING TESTED. When the node receives a message saying "start testing", the automation is transferred to a testing state and a message "Is everything in order?" is sent to the opposite end. There are two ways to leave the testing state for another main state. The transition is made in the one way if a message "at the opposite end the route is in order" is received, and then, a message "testing in order" is sent and a transition is made to the state ROUTE NOT TESTED. The same transition can be made in the other way by receiving in the testing state, either a message "fault at the opposite end" or a message "fault on the route" or after a time-out. At the same time, a message "testing failed" is sent.

Although the invention was above explained with reference to the examples of the accompanying drawings, it is clear that the invention is in no way restricted thereto, but it can be modified within the scope of the inventive concept disclosed above and in the appended claims. As was mentioned above, the arrangement of the invention does not, for example, require of the internal structure of the node anything else but the ability to buffer data. Therefore, the internal structure of the node can be accomplished in many ways known per se. The buffering itself can also be carried out in different ways; the outgoing or incoming data or both can be buffered. The most natural procedure is, however, to buffer the outgoing data. Also, the operation of the state automations, for example, can vary in many ways although they realize the essential idea of the invention; only one example of their operation is shown above.

I claim:

1. A method for rerouting a packet-mode data connection in a network, in which, between a first node serving a first subscriber and a second node serving a second subscriber, at least two alternatively useful bi-directional communication routes are potentially available for use as alternatives to one another, these comprising at least a first route and a second route, and both of said nodes being capable of buffering data packets which a respective one of said subscribers intends to have transmitted by a respective one of said nodes, to the respective other of said subscribers via the respective other of said nodes, comprising the steps of:

while in operation for at least one of sending and receiving data packet traffic to and from one another for respective subscribers, over a respective one of said routes which is currently in use, said first and second nodes listening not only to the respective route in use, but also to a at least another of said routes as a respective alternative route for use as an alternative to said one of said routes which is currently in use;

either or both of said nodes, in connection with determining to change from sending packet data traffic to the respective other of said nodes via the respective said one of said routes which is currently in use, to a respective alternate route, sending a corresponding message about rerouting to the respective other of said nodes via said respective alternate route; and the respective other said nodes, based on the first to occur of reception of a respective said message about rerouting and a practice thereby of said determining, participating with the respective other of said nodes in a rerouting situation which, upon completion, results in said first and second nodes both being in operation for at least one of sending and receiving data packet traffic to and from one another over a respective alternate one of said routes, said determining is practiced by one of said nodes, upon detecting or being informed of a fault in said one of said routes which is currently in use, and said message about rerouting therefore being of a type concerning forced rerouting involving buffering, the respective other of said nodes, upon receiving said message about rerouting, (a) ceasing sending packet data traffic to the respective other of said nodes on said respective one of said routes, and, instead, buffering such traffic;

(b) testing the condition of said respective one of said routes; and (c) upon finding said condition of said respective one of said routes to be faulty, ceasing buffering of such traffic, and initiating sending of such traffic, starting with that which was buffered, to the respective other of said nodes using a respective alternate of one of said routes.

2. The method of claim 1, wherein:

said sending and receiving data packet traffic is constituted by sending and receiving frames by frame relay.

3. The method of claim 1, wherein:

said determining is practiced by each of said nodes, upon detecting or being informed of a fault in said one of said routes which is currently in use, each said message about rerouting therefore being of a type concerning forced rerouting.

4. A method for rerouting a packet-mode data connection in a network, in which, between a first node serving a first subscriber and a second node serving a second subscriber, at least two alternatively useful bi-directional communication routes are potentially available for use as alternatives to one another, these comprising at least a first route and a second route, and both of said nodes being capable of buffering data packets which a respective one of said subscribers intends to have transmitted by a respective one of said nodes, to the respective other of said subscribers via the respective other of said nodes, comprising the steps of:

while in operation for at least one of sending and receiving data packet traffic to and from one another for respective subscribers, over a respective one of said routes which is currently in use, said first and second nodes listening not only to the respective route in use, but also to a at least another of said routes as a respective alternative route for use as an alternative to said one of said routes which is currently in use;

either or both of said nodes, in connection with determining to change from sending packet data traffic to the respective other of said nodes via the respective said one of said routes which is currently in use, to a respective alternate route, sending a corresponding message about rerouting to the respective other of said nodes via said respective alternate route; and the respective other said nodes, based on the first to occur of reception of a respective said message about rerouting and a practice thereby of said determining, participating with the respective other of said nodes in a rerouting situation which, upon completion, results in said first and second nodes both being in operation for at least one of sending and receiving data packet traffic to and from one another over a respective alternate one of said routes, wherein each said message about rerouting, as sent, contains information as to the position of the node which sent that message in a pre-established hierarchy of nodes which also includes the respective other of said nodes; and said rerouting situation is practiced by said first and second nodes so as to result in rerouting to a common alternative to said one of said routes, that results either from both of said nodes independently selecting that alternative route, or, upon both of said nodes, by prearrangement, the respective alternative route selected by the one of said nodes having the relatively higher position in said hierarchy being put into use for said rerouting by both of said nodes.

5. The method of claim 4, wherein:

said sending and receiving data packet traffic is constituted by sending and receiving frames by frame relay.

6. The method of claim 4, wherein:

said determining is practiced by each of said nodes, upon detecting or being informed of a fault in said one of said routes which is currently in use, each said message about rerouting therefore being of a type concerning forced rerouting.

7. The method of claim 4, wherein:

the respective other of said nodes, upon receiving said message about rerouting, and having a lower position in said hierarchy than the node which sent said message, (a) ceasing sending packet data traffic to the respective other of said nodes on said respective one of said routes, and, instead, buffering such traffic;

(b) sending the respective other of said nodes a return-from-route notice; and (c) in response to receiving from the respective other of said nodes an acknowledgement of receipt of said return-from-route notice, ceasing buffering of such traffic, and initiating sending of such traffic, starting with that which was buffered, to the respective other of said nodes using the respective alternate one of said routes.

8. A method for rerouting a packet-mode data connection in a network, in which, between a first node serving a first subscriber and a second node serving a second subscriber, at least two alternatively useful bi-directional communication routes are potentially available for use as alternatives to one another, these comprising at least a first route and a second route, and both of said nodes being capable of buffering data packets which a respective one of said subscribers intends to have transmitted by a respective one of said nodes, to the respective other of said subscribers via the respective other of said nodes, comprising the steps of:

while in operation for at least one of sending and receiving data packet traffic to and from one another for respective subscribers, over a respective one of said routes which is currently in use, said first and second nodes listening not only to the respective route in use, but also to a at least another of said routes as a respective alternative route for use as an alternative to said one of said routes which is currently in use;

either or both of said nodes, in connection with determining to change from sending packet data traffic to the respective other of said nodes via the respective said one of said routes which is currently in use, to a respective alternate route, sending a corresponding message about rerouting to the respective other of said nodes via said respective alternate route; and the respective other said nodes, based on the first to occur of reception of a respective said message about rerouting and a practice thereby of said determining, participating with the respective other of said nodes in a rerouting situation which, upon completion, results in said first and second nodes both being in operation for at least one of sending and receiving data packet traffic to and from one another over a respective alternate one of said routes, wherein said determining is practiced by one of said nodes, upon detecting or being informed of a fault in said one of said routes which is currently in use, and said message about rerouting therefore being of a type concerning forced rerouting involving buffering, said one of said nodes, upon practicing said determining to change, sending as said message about rerouting a message of a type concerning forced rerouting involving no buffering, and, without buffering to await receipt of an acknowledgement immediately changes to sending packet data traffic to the respective other of said nodes via a respective said alternate route; and the respective other of said nodes, upon receiving said message about rerouting, ceasing sending packet data traffic to the respective other of said nodes on said respective one of said routes, and, instead, without buffering such traffic, initiating sending of such traffic to the respective other of said nodes, using the respective alternate one of said routes.

9. The method of claim 4, wherein:
said sending and receiving data packet traffic is constituted by sending and receiving frames by frame relay.

10. The method of claim 4, wherein:
said determining is practiced by each of said nodes, upon detecting or being informed of a fault in said one of said routes which is currently in use, each said message about rerouting therefore being of a type concerning forced rerouting.

11. A method for rerouting a packet-mode data connection in a network, in which, between a first node serving a first subscriber and a second node serving a second subscriber, at least two alternatively useful bi-directional communication routes are potentially available for use as alternatives to one another, these comprising at least a first route and a second route, and both of said nodes being capable of buffering data packets which a respective one of said subscribers intends to have transmitted by a respective one of said nodes, to the respective other of said subscribers via the respective other of said nodes, comprising the steps of:

while in operation for at least one of sending and receiving data packet traffic to and from one another for respective subscribers, over a respective one of said routes which is currently in use, said first and second nodes listening not only to the respective route in use, but also to a at least another of said routes as a respective alternative route for use as an alternative to said one of said routes which is currently in use;

either or both of said nodes, in connection with determining to change from sending packet data traffic to the respective other of said nodes via the respective said one of said routes which is currently in use, to a respective alternate route, sending a corresponding message about rerouting to the respective other of said nodes via said respective alternate route; and the respective other said nodes, based on the first to occur of reception of a respective said message about rerouting and a practice thereby of said determining, participating with the respective other of said nodes in a rerouting situation which, upon completion, results in said first and second nodes both being in operation for at least one of sending and receiving data packet traffic to and from one another over a respective alternate one of said routes, wherein said determining is practiced by one of said nodes, upon detecting or being informed of a reason other than a fault in said one of said routes which is currently in use, and said message about rerouting thereby being of a type concerning controlled rerouting involving buffering; and said rerouting situation comprises:
(a) both of said nodes buffering packet data traffic intended to be sent to one another, while coming to an agreement as to which of said alternative routes to switch to as an alternative route as an agreed alternate route to use for exchanging packet data traffic;
(b) both of said nodes sending return-from-route-notices to one another on said one of said nodes which is currently in use;
(c) each of said nodes acknowledging to the respective other of said nodes reception of the respective one of said return-from-route notices; and
(d) each of said nodes, in response to its receipt of the respective said acknowledging, ceasing its said buffering, and sending packet data traffic, beginning with that which was buffered, to the respective other of said nodes, via said agreed alternate route.

12. The method of claim 11, wherein:
said sending and receiving data packet traffic is constituted by sending and receiving frames by frame relay.

13. The method of claim 11, wherein:
said determining is practiced by each of said nodes, upon detecting or being informed of a fault in said one of said routes which is currently in use, each said message about rerouting therefore being of a type concerning forced rerouting.

14. The method of claim 11, wherein:
both of said nodes practice said sending of return-from-route notices, by routing their respective said notices after ordinary data packets in respective data packet traffic.

15. The method of claim 11, wherein:
each said message about rerouting, as sent, contains information as to the position of the node which sent that message in a pre-established hierarchy of nodes which also includes the respective other of said nodes; and said rerouting situation is practiced by said first and second nodes so as to result in rerouting to a common alternative to said one of said routes, that results either from both of said nodes independently selecting that alternative route, or, upon both of said nodes, by prearrangement, the respective alternative route selected by the one of said nodes having the relatively higher position in said hierarchy being put into use for said rerouting by both of said nodes.

16. A method for rerouting a packet-mode data connection in a network, in which, between a first node serving a first subscriber and a second node serving a second subscriber, at least two alternatively useful bi-directional communication routes are potentially available for use as alternatives to one another, these comprising at least a first route and a second route, and both of said nodes being capable of buffering data packets which a respective one of said subscribers intends to have transmitted by a respective one of said nodes, to the respective other of said subscribers via the respective other of said nodes, comprising the steps of:

while in operation for at least one of sending and receiving data packet traffic to and from one another for respective subscribers, over a respective one of said routes which is currently in use, said first and second nodes listening not only to the respective route in use, but also to a at least another of said routes as a respective alternative route for use as an alternative to said one of said routes which is currently in use;

either or both of said nodes, in connection with determining to change from sending packet data traffic to the respective other of said nodes via the respective said one of said routes which is currently in use, to a respective alternate route, sending a corresponding message about rerouting to the respective other of said nodes via said respective alternate route; and the respective other said nodes, based on the first to occur of reception of a respective said message about rerouting and a practice thereby of said determining, participating with the respective other of said nodes in a rerouting situation which, upon completion, results in said first and second nodes both being in operation for at least one of sending and receiving data packet traffic to and from one another over a respective alternate one of said routes, wherein said determining is practiced by one of said nodes, upon detecting or being informed of a reason other than a fault in said one of said routes which is currently in use, and said message about rerouting thereby being of a type concerning controlled rerouting involving buffering; and said rerouting situation comprises:
- (a) both of said nodes buffering packet data traffic intended to be sent to one another, while coming to an agreement as to which of said alternative routes to switch to as an alternative route as an agreed alternate route to use for exchanging packet data traffic;
- (b) both of said nodes sending return-from-route-notices to one another on said one of said nodes which is currently in use;
- (c) each of said nodes acknowledging to the respective other of said nodes reception of the respective one of said return-from-route notices; and
- (d) each of said nodes, in response to whichever first occurs of its receipt of the respective said acknowledging and the expiration of a certain predetermined waiting time period, ceasing its said buffering, and sending packet data traffic, beginning with that which was buffered, to the respective other of said nodes, via said agreed alternate route.

17. The method of claim 16, wherein:

each said message about rerouting, as sent, contains information as to the position of the node which sent that message in a pre-established hierarchy of nodes which also includes the respective other of said nodes; and said rerouting situation is practiced by said first and second nodes so as to result in rerouting to a common alternative to said one of said routes, that results either from both of said nodes independently selecting that alternative route, or, upon both of said nodes, by prearrangement, the respective alternative route selected by the one of said nodes having the relatively higher position in said hierarchy being put into use for said rerouting by both of said nodes.

18. The method of claim 16, wherein:

said sending and receiving data packet traffic is constituted by sending and receiving frames by frame relay.

19. The method of claim 16, wherein:

said determining is practiced by each of said nodes, upon detecting or being informed of a fault in said one of said routes which is currently in use, each said message about rerouting therefore being of a type concerning forced rerouting.

\* \* \* \* \*